Oct. 23, 1951   H. W. McPHERSON   2,572,175
VALVE OPERATOR
Original Filed Jan. 14, 1944
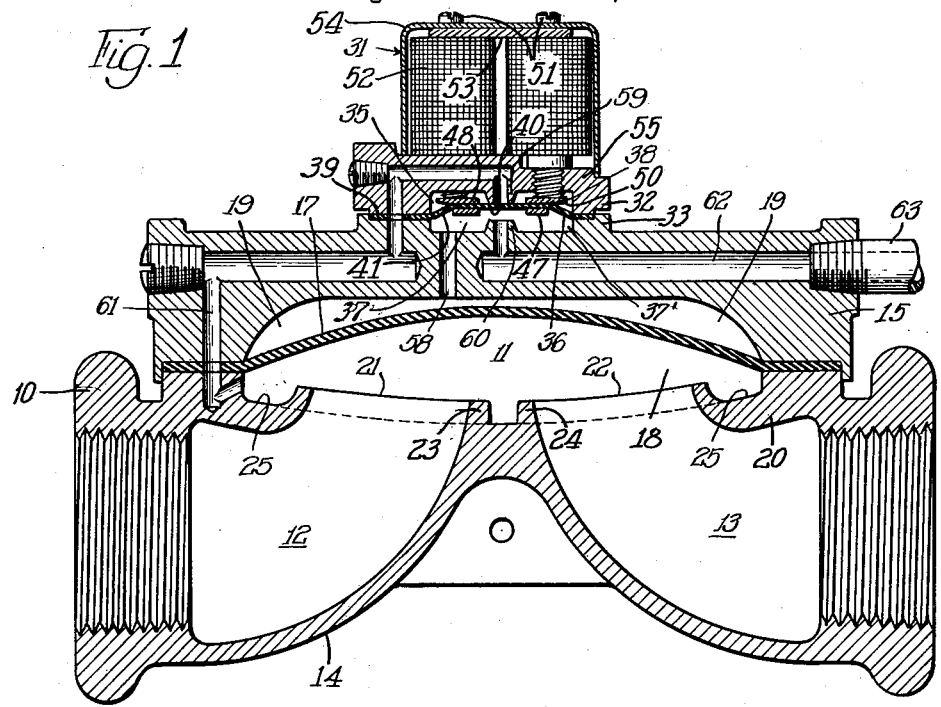
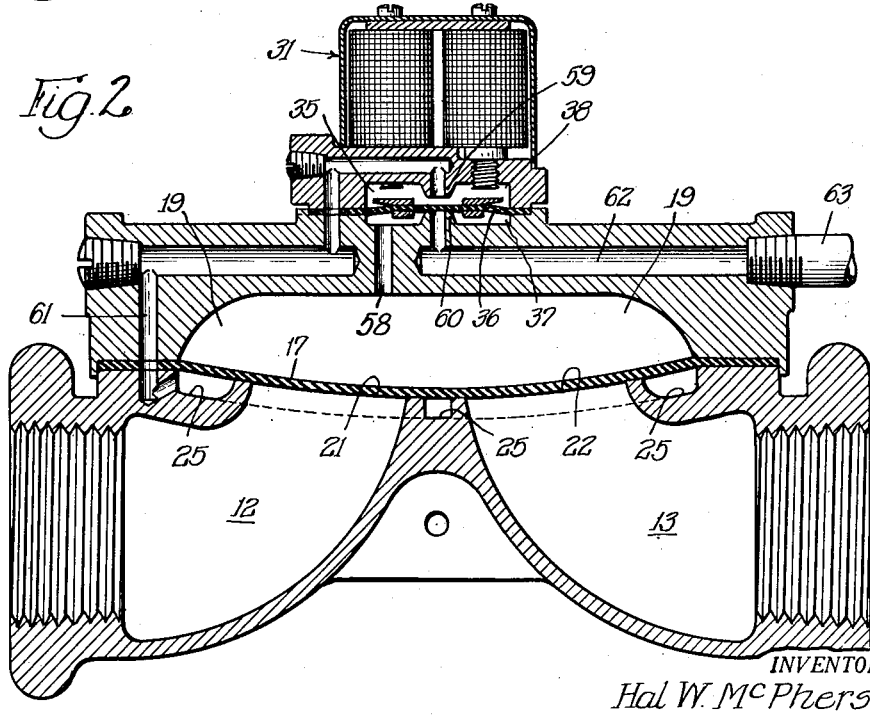
INVENTOR.
Hal W. McPherson,
BY
Cromwell, Greist & Warden.
ATTYS.

Patented Oct. 23, 1951

2,572,175

UNITED STATES PATENT OFFICE

2,572,175
VALVE OPERATOR

Hal W. McPherson, Chicago, Ill., assignor, by mesne assignments, to The Skinner Chuck Company, a corporation of Connecticut Original application January 14, 1944, Serial No. 518,233, now Patent No. 2,407,761, dated September 17, 1946. Divided and this application June 6, 1945, Serial No. 597,738

2 Claims. (Cl. 137—139)

This is a division of my copending application Serial No. 518,233, filed January 14, 1944 for Valves, now U. S. Letters Patent 2,407,761 issued September 17, 1946.

This invention has to do with valves, and is particularly concerned with an operator or pilot for shut-off valves of the type in which the pressure of the fluid entering the valve is utilized to either open or close the valve under the control of an associated operating device, although also generally useful as a fluid flow control in other applications.

It is an object of the invention to provide an electromagnetically-energized operator or pilot having utility as a control device for a valve or analogous member, which device is unfailingly reliable in operation under all conditions of pressure, temperature and the like.

Still another object is to provide, in connection with a valve of the type described, an improved solenoid-actuated operator for controlling the valve, which operator uses but a very small amount of current.

While an operator constructed in accordance with the present invention can be used advantageously in many different applications, it is especially well suited for use in airplane fuel line applications and other similarly exacting situations where lightness, compactness, simplicity, ease of control, and dependability are factors of prime importance.

The foregoing statements are indicative in a general way of the nature of the invention but other more specific objects and advantages will be apparent to those skilled in the art upon a full understanding of the construction and operation of the new valve.

In the accompanying drawings:

Fig. 1 is a vertical section through the center of a fully balanced valve having an operator constructed in accordance with the invention, showing the valve open; and Fig. 2 is a similar section, showing the valve closed.

As will be observed in these views, the valve includes a body 10 which contains a chamber 11, an inlet port 12, and an outlet port 13. The body 10 is composed of two complementary parts 14 and 15 which are suitably fastened together. The chamber 11 in the body is a shallow circular cavity which is divided by a flexible diaphragm 17 into a front portion 18 and a rear portion 19. The portion 19 may therefore be considered as a substantially-closed chamber which includes a flexible diaphragm as one wall thereof. The front wall 20 of the chamber 11 is dished forwardly to conform generally to the shape of the diaphragm 17 when the latter is in its forwardly-flexed position, and is provided with two circular seats 21 and 22 which are located at opposite sides of the center of the front portion of the chamber 11 in laterally-spaced relation to each other. The seats 21 and 22 form the ends of the inlet and outlet ports 12 and 13, and are located on bead-like rims 23 and 24 which project rearwardly from the front wall 20, leaving channels 25 in the front portion of the chamber 11 about such rims. The seats 21 and 22 have the same dished curvature as diaphragm 17 when the latter is in its forwardly-flexed position (Fig. 2), and are adapted to be engaged and sealed by the diaphragm 17.

The diaphragm 17 is fluid impervious. The fluid used in flooding the rear portion 19 of the chamber 11 to move the diaphragm forwardly into sealed engagement with the seats 21 and 22 both enters and leaves the rear portion 19 through a duct 58. The valve is fully balanced in the sense that it will handle a flow passing through the valve in either direction, i. e., ports 12 and 13 may be interchanged as inlet and outlet ports.

A solenoid operator 31 is connected with the valve for operating the same. This operator includes a base plate 32 which is secured to the rear wall 33 of the chamber 11 by suitable means. The operator 31 is provided with a relatively small, shallow circular chamber 35, which chamber is formed partly in the base plate 32 and partly in the rear wall 33. The chamber 35 contains a thin marginally-perforated flexible diaphragm 36 which is clamped marginally between the base plate and the rear wall. The diaphragm 36 divides the chamber 35 into a front portion 37 and a rear portion 38. The diaphragm is provided at its outer edge with a thickened portion 39 of synthetic rubber or other suitable sealing material, and is provided, at its center, with a portion 40 of similar sealing material. The diaphragm 36 has a marginally perforated portion 41, through which the fluid can flow to equalize the pressure in the chamber 35 on both sides of the diaphragm. The portion 41 also acts as a protecting filter for the cooperating parts of the solenoid. The center portion 40 of the diaphragm is adapted to engage the valve seats presently to be described.

The diaphragm 36 is the operator 31 is provided on its front face with an annular reinforcing washer 47 on its rear face with an annular armature disk 48. The washer 47 and the disk 48 are suitably secured together through the imperforate center portion 40 of the diaphragm. The outer edge of the disk 48 is beveled at 50 to permit the diaphragm to cup to a certain extent about the same when the diaphragm is flexed forwardly. The openings in the center of the washer 47 and the disk 48 are larger than the seats with which they are to cooperate, as will presently be explained.

The base plate 32 of the operator 31 supports two suitable pole pieces 51 which are threaded through the base plate into the rear portion 38 of the chamber 35 at points equidistant from the center of the armature disk 48, for electromagnetic coaction with the latter. The pole pieces are encircled by magnetic coils 52 and are bridged by a tie bar 53 to form the electromagnet of a solenoid. This electromagnet is housed within a cap 54 which fits over a rim 55 on the base plate. The diaphragm 36 is movable rearwardly into sealed engagement with an annular seat 59 and is movable forwardly into sealed engagement with an annular seat 60. The seat 59 forms the end of a duct 61 which leads by a rather circuitous path from one of the connected channels 25 surrounding the seats 21 and 22 in the front portion 18 of the chamber 11 in the valve. The seat 59 opens into the rear portion 38 of the chamber 35 in the operator and communicates with the duct 58 through the perforated portion of the diaphragm 36 when the latter is in its forwardly-flexed position in sealed engagement with the seat 60. The seat 60 forms the entrance to a duct 62 which during the opening movement only of the valve discharges a small quantity of the fluid either into the atmosphere or into a conduit 63 leading to a container or other low pressure part of the system. The duct 58 communicates with the discharge duct 62 through the front portion 37 of the chamber 35 when the diaphragm 36 is in its rearwardly flexed position in sealed engagement with the seat 59.

When the solenoid in the operator 31 is in its energized condition, as shown in Fig. 1, the seat 59 will be closed and the seat 60 will be open. As a result, the duct 61 used in flooding the rear portion 19 of the chamber 11 during the valve-closing operation will be closed and the duct 62 used in evacuating the rear portion 19 during the valve opening operation will be open to the atmosphere, maintaining the diaphragm 17 in its rearwardly-flexed or open position. When the solenoid in the operator is de-energized, as shown in Fig. 2, the seat 59 will be opened and the seat 60 will be closed. This will open the duct 61 and allow the fluid being handled through ports 12 and 13 to pass through such duct into the rear portion 19 of the chamber. The fluid entering the rear portion will be pocketed in the same and prevented from leaving by the closed condition of the duct 62, and will result in the rear portion 19 of the chamber becoming flooded, causing the diaphragm 17 to move into sealed engagement with first one of the ports 21 and 22 and then the other, the order depending, of course, upon the direction of flow between ports 12 and 13. When the diaphragm 17 has flexed forwardly into a position wherein the downstream seat of the seats 21 and 22 is engaged by the diaphragm, the fluid will continue to flow momentarily from the upstream seat into the channels 25 and thence through duct 61 until the pressure behind the diaphragm 17 urging it against the seats has reached the pressure of the fluid in the inlet port, whereupon the diaphragm will be securely sealed against the seats and maintained in such sealed condition by the pressure of the fluid on the inlet side. After the valve has been closed it will shut off the flow through the valve between ports 12 and 13 and will hold the fluid against pressure in either direction. When the solenoid is again energized, the fluid pocketed behind the diaphragm 17 will escape through the duct 62 and the valve will resume its opened position.

If it is desired to have the valve move into its closed position instead of into its open position when the solenoid in the operator 31 is energized, this can be done very simply by substituting an operator in which the positions of the seats 59 and 60 with respect to the diaphragm 36 are reversed.

In constructing a valve in accordance with the invention, the metal parts of the valve are preferably made of aluminum, or of some alloy of aluminum, whereby to reduce the weight of the valve to a minimum and at the same time avoid the necessity of insulating the electrically-actuated parts of the operator. Said operator, as illustrated and described, is reliable and unfailing in action under the most exacting conditions. As stated, fluid pressure on opposite sides of the armature carrying diaphragm 36 is equalized by the perforated construction thereof. Hence, the factor of variable pressure is nullified in the calculation of the requisite electromagnetic force which must be selectively first produced at the solenoid poles and then diminished or eliminated in order to enable alternate shifting of the diaphragm from the seat-exposing position of Fig. 1 to the seat-covering position of Fig. 2.

I claim:

1. In a valve of the type having means defining a substantially closed chamber including a flexible diaphragm as one wall thereof, spaced inlet and outlet valve seat means external to said chamber, said diaphragm constituting a valve head means for said valve seat means, first duct means for providing communication between said chamber and said inlet and outlet valve seat means at a point between said inlet and outlet valve seat means for ingress of fluid to said chamber from said valve seat means, and second duct means for egress of fluid from said chamber, said chamber being expandible and contractible by means of said diaphragm to cause coaction between said diaphragm and valve seat means responsive to said ingress and egress of said fluid to and from said chamber, the improvement comprising an apparatus for controlling said ingress and egress comprising means defining a second chamber in communication with said first mentioned chamber and interposed between the latter chamber and said first and second duct means, said second chamber having fluid inlet and outlet ports respectively in communication with said first and second duct means, an electromagnetically responsive diaphragm device extending across said second chamber and having a port engaging element alternately engageable with one or the other of said ports to cut off ingress or egress of fluid relative to said second chamber, and controllably energizable electromagnetic means effective upon energization thereof to cause engagement of said port engaging element with one of said ports, and upon deenergization thereof to permit engagement of said port engaging element with the other of said ports, said diaphragm device being perforated for equalization of fluid pressure on opposite sides of the device regardless of which port is engaged thereby.

2. In a valve of the type having means defining a substantially closed chamber including a flexible diaphragm as one wall thereof, spaced inlet and outlet valve seat means external to said chamber, said diaphragm constituting a valve head means for said valve seat means, first duct means for providing communication between said chamber and said inlet and outlet valve seat means at a point between said inlet and outlet valve seat means for ingress of fluid to said chamber from said valve seat means, and second duct means for egress of fluid from said chamber, said chamber being expandible and contractible by means of said diaphragm to cause coaction between said diaphragm and valve seat means responsive to said ingress and egress of said fluid to and from said chamber, the improvement comprising an apparatus for controlling said ingress and egress comprising means defining a second chamber in communication with said first mentioned chamber and interposed between the latter chamber and said first and second duct means, said second chamber having fluid inlet and outlet ports respectively in communication with said first and second duct means, a second flexible diaphragm having an electromagnetic armature thereon and extending across said second chamber, said second diaphragm being selectively engageable with one or the other of said ports to cut off fluid ingress to or egress from said second chamber through said first and second duct means, and controllably energizable electromagnetic means effective upon energization thereof to cause engagement of said diaphragm with said inlet port and upon de-energization thereof to permit engagement of said diaphragm with said outlet port, said diaphragm being perforated for equalization of fluid pressure on opposite sides thereof regardless of which port is engaged thereby.

HAL W. McPHERSON.

REFERENCES CITED

The following references are of record in the file of this patent:

UNITED STATES PATENTS

| Number | Name | Date |
|---|---|---|
| 409,170 | Wheeler | Aug. 20, 1889 |
| 1,767,201 | Boynton | June 24, 1930 |
| 2,054,909 | Morehouse | Sept. 22, 1936 |
| 2,117,096 | Klawitter | May 10, 1938 |
| 2,216,855 | Sanford | Oct. 8, 1940 |
| 2,263,819 | Ray | Nov. 25, 1941 |
| 2,289,456 | Ray | July 14, 1942 |
| 2,292,477 | Ray | Aug. 11, 1942 |
| 2,358,828 | Ray | Sept. 26, 1944 |
| 2,382,664 | Ray | Aug. 14, 1945 |
| 2,388,868 | Ray | Nov. 13, 1945 |
| 2,407,761 | McPherson | Sept. 17, 1946 |